(12) United States Patent
Mather

(10) Patent No.: US 8,474,298 B2
(45) Date of Patent: Jul. 2, 2013

(54) SHAPE ADJUSTING TOOL

(75) Inventor: Andrew V Mather, Grindleford (GB)

(73) Assignee: Rolls-Royce, PLC, London (GB)

( * ) Notice: Subject to any disclaimer, the term of this patent is extended or adjusted under 35 U.S.C. 154(b) by 55 days.

(21) Appl. No.: 13/275,537

(22) Filed: Oct. 18, 2011

(65) Prior Publication Data
US 2012/0111084 A1 May 10, 2012

(30) Foreign Application Priority Data

Nov. 8, 2010 (GB) .................................. 1018756.5

(51) Int. Cl.
*B21J 13/02* (2006.01)
*B23Q 3/08* (2006.01)
*B25B 5/14* (2006.01)

(52) U.S. Cl.
USPC .............. 72/393; 72/392; 72/396; 72/370.08; 29/56.6; 29/402.01; 29/402.09; 29/451

(58) Field of Classification Search
USPC .................. 72/370.08, 370.16, 402, 408, 450, 72/392; 29/56.6, 283.5, 402.01, 402.09, 451
See application file for complete search history.

(56) References Cited

U.S. PATENT DOCUMENTS

| | | | | |
|---|---|---|---|---|
| 1,823,047 A | * | 9/1931 | Hothersall | ........................ 29/523 |
| 3,109,477 A | * | 11/1963 | Avera et al. | ...................... 72/466 |
| 4,345,453 A | | 8/1982 | Lillbacka | |
| 4,406,151 A | * | 9/1983 | Simonsen et al. | .............. 72/478 |
| 4,778,252 A | | 10/1988 | Filho | |
| 5,203,197 A | | 4/1993 | Depperman | |
| 5,444,902 A | | 8/1995 | Casturo et al. | |
| 5,894,753 A | * | 4/1999 | Sachot et al. | ................... 72/402 |
| 8,347,477 B2 | * | 1/2013 | Kakine et al. | .............. 72/370.08 |

FOREIGN PATENT DOCUMENTS

| | | |
|---|---|---|
| GB | 1 201 435 A | 8/1970 |
| WO | WO 00/24546 A1 | 5/2000 |

OTHER PUBLICATIONS

Mar. 8, 2011 Search Report issued in British Application No. GB1018756.5.
Feb. 6, 2012 European Search Report issued in European Patent Application No. 11 18 5551.

* cited by examiner

Primary Examiner — David B Jones
(74) Attorney, Agent, or Firm — Oliff & Berridge, PLC

(57) ABSTRACT

A hollow component is adjusted in shape, for example to correct circularity, by means of a shape adjusting tool. The tool comprises a base structure on which adjuster elements are guided. An adjustment ring has a ramp surface corresponding to each adjuster element so that rotation of the adjustment ring causes radial displacement of the adjuster elements 6. The adjuster elements are displaced in unison, and engage the internal surface of the component to be adjusted so as to deform the component to the desired shape. The segments are interconnected by rigid links and a single flexible link, and are supported on bearing rollers mounted on the base structure.

14 Claims, 2 Drawing Sheets

SHAPE ADJUSTING TOOL

This invention claims the benefit of UK Patent Application No. 1018756.5, filed on 8 Nov. 2010, which is hereby incorporated herein in its entirety.

This invention relates to a shape adjusting tool, and is particularly, although not exclusively, concerned with a tool for correcting the circularity of hollow cylindrical components.

BACKGROUND

Large-diameter thin-walled hollow components sometimes need to be rounded, or corrected for circularity, in the course of manufacture or repair. Various tools have been used for roundness correction, such as expanding split collets and tools having an array of levers actuated by a central plunger. Such tools tend to have considerable mass, and can introduce further distortions into the component to be corrected. Also, known tools tend to fill the interior of the component to be corrected, and so obstruct other measuring or machining operations.

Split collets have been used which have an annular expander core which reduces obstruction, but the expander core is driven by an array of bolts distributed around it, and these must be tightened in exact unison to ensure equal expansion around the periphery of the split collet.

STATEMENTS OF INVENTIONS

According to the present invention, there is provided a shape adjusting tool for adjusting the shape of a hollow component, the tool comprising a base structure carrying a plurality of adjuster elements which are distributed circumferentially about an axis of the tool; and an adjustment ring which is mounted on the base structure for rotation about the axis, the adjustment ring being resilient in the circumferential direction, wherein a respective ramp arrangement is provided on the adjustment ring corresponding to each adjuster element and the adjustment ring whereby rotation of the adjustment ring about the axis causes radial displacement of each adjuster element.

A shape adjusting tool in accordance with the present invention can be assembled from sheet metal parts, and consequently can be relatively light in weight. Also, the base structure can have an annular form to permit access to the interior of the hollow component while the shape adjusting tool is deployed.

The adjustment ring may include a circumferentially resilient element. The adjustment ring may comprise a plurality of segments, with the resilient element situated at one of the junctions between adjacent segments. The other junctions between adjacent segments may be rigid in the circumferential direction.

Each segment may engage two of the adjuster elements through the respective ramp arrangements. The adjustment ring may comprise six of the segments, and may comprise twelve adjuster elements.

Each ramp arrangement may comprise a ramp surface on the adjustment ring which directly engages the respective adjuster element. There may be a linear relationship between the angular position of the adjustment ring and the radial position of each adjuster element. The relationship may be the same for all of the adjuster elements, so that the adjuster elements move in unison on rotation of the adjustment ring.

The adjustment ring may be supported on the base structure by bearing rollers which are distributed circumferentially about the axis. A respective roller may be provided at the same angular position as each adjuster element.

If the adjustment ring is segmented, each segment may be supported by two of the rollers.

The tool may comprise means for rotating the adjustment ring. The rotating means may comprise a circumferentially extending rack on the adjustment ring and a pinion on the base structure.

The adjusting tool may be adapted to engage the inside surface of the hollow component, in which case the ramp arrangements may be disposed to drive the adjustment elements radially outwards as the adjustment ring is rotated. In alternative embodiments, the adjusting tool may be adapted to engage the outer surface of the hollow component. Furthermore, although the adjusting tool may be configured to correct the circularity of a cylindrical hollow component, the adjuster elements may be disposed and actuated by means of the adjustment ring so as to correct the shape of a hollow component having a nominal shape which is non-circular.

BRIEF DESCRIPTION OF THE DRAWINGS

For a better understanding of the present invention, and to show more clearly how it may be carried into effect, reference will now be made, by way of example, to the accompanying drawings, in which:—

DETAILED DESCRIPTION

Figure 1:
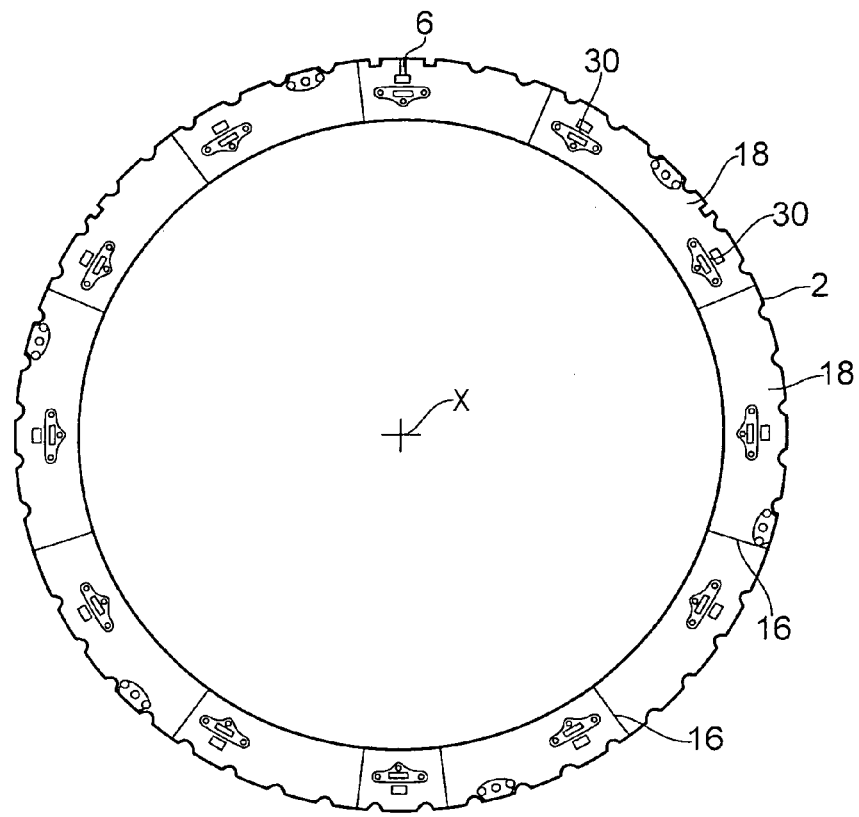
FIG. 1 is an axial view of a shape adjusting tool.
Figure 2:
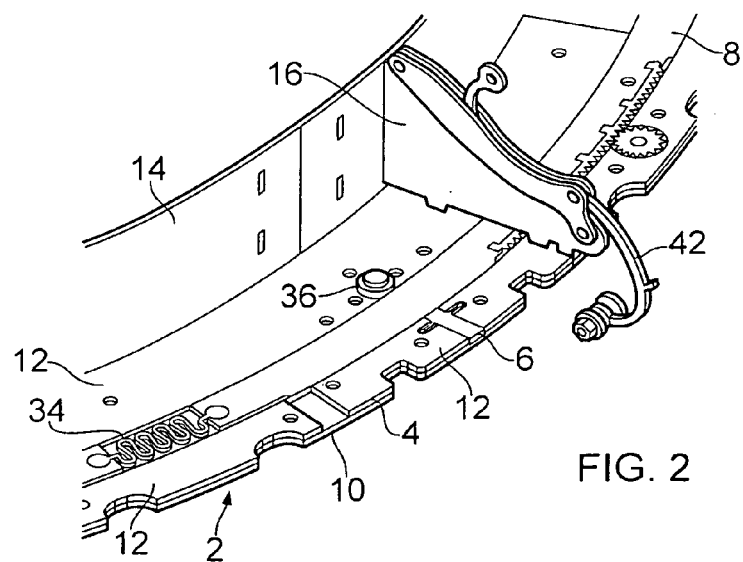
FIG. 2 is a partial perspective view of the tool of FIG. 1.

With reference to FIGS. 1 and 2, the tool comprises a base structure 2 comprising a supporting plate 4. The supporting plate 4 carries an array of adjuster elements 6 or plungers and an adjustment ring 8. The supporting plate 4 has a double-layered structure, comprising a base plate 10 and guide plates 12 which guide movement of the adjuster elements 6 and the adjustment ring 8 and which define the spacing between the base plate 10 and a cover plate 18. A circumferential inner web 14 and radial webs 16 are secured to the supporting plate 4 to enhance its rigidity. As shown in FIG. 1, cover plates 18 are secured over the supporting plate 4 to retain the adjuster elements 6 and the adjustment ring 8. The cover plate is provided with a series of cut-outs, or windows, which permits visual access to portions of the adjustment ring when the cover plate is in position. The cover plates 18 are not shown in FIGS. 2 to 5.

Figure 3:
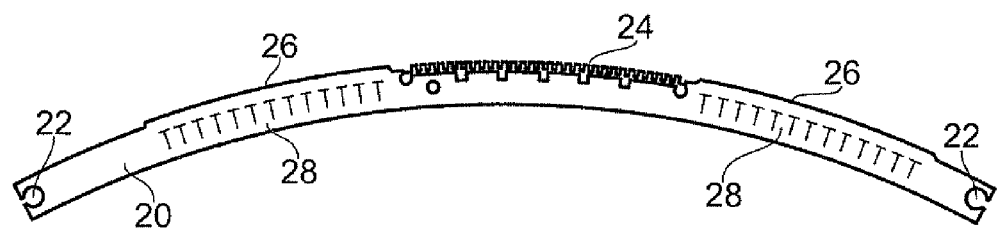
FIG. 3 shows a segment of an adjustment ring of the tool of FIGS. 1 and 2.

The adjustment ring 8 comprises six identical segments 20, one of which is shown in FIG. 3. Each segment 20 has an undercut notch 22 at each end and subtends an angle between its ends of slightly less than 30 degrees. In its central region, the segment 20 is fitted with a circumferentially extending toothed rack 24. On each side of the rack 24 there is a ramp surface 26. Thus, the radial thickness of the segment 20 increases from the left-hand of each ramp 26 towards the right-hand end, as viewed in FIG. 3. A scale 28 is provided along each ramp surface 26, and part of each scale 28 is visible through a window 30 in the respective cover plate 18 (see FIG. 1).

Figure 4:
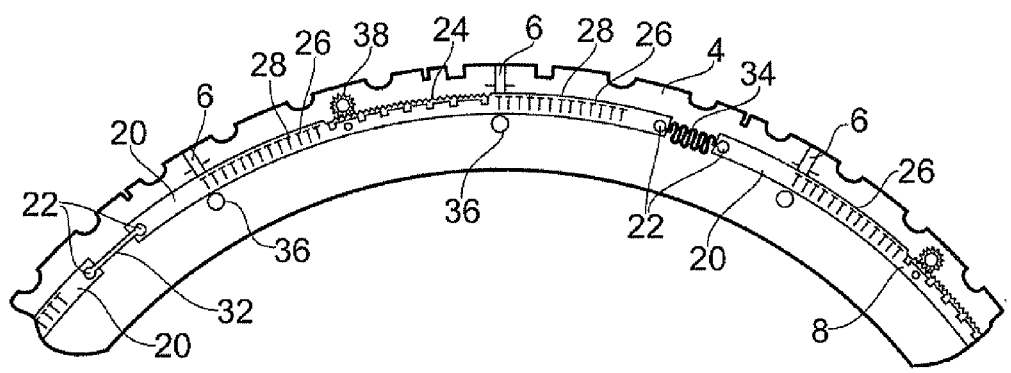
FIG. 4 shows part of the tool.

FIG. 4 shows, at least in part, three of the segments 20 mounted on the supporting plate 4. The middle one of the segments 20 is connected to the one to its left by a rigid link 32 which engages the respective notches 22 in the segments 20. The middle segment 20 is connected to the segment 20 on its right by a resilient link 34, which also engages the respective notches 22. Apart from the single resilient link 34 shown in FIG. 4, all of the other junctions between adjacent segments 20 are made by way of rigid links 32.

The adjustment ring 8 is supported for rotation on the supporting plate 4 by means of fixed-axis bearing rollers 36 which are distributed regularly around the supporting plate 4. Each segment 20 is supported by two rollers 36, and the resilient link 34 enables the circumferential length of the adjustment ring 8 to vary slightly in order to ensure that the adjustment ring 8 as a whole is in contact with each one of the rollers 36.

The supporting plate 4 also carries a respective pinion 38 for the rack 24 of each segment 20. Each pinion 38 has a square, or otherwise non-circular, opening for receiving a drive tool.

Figure 5:
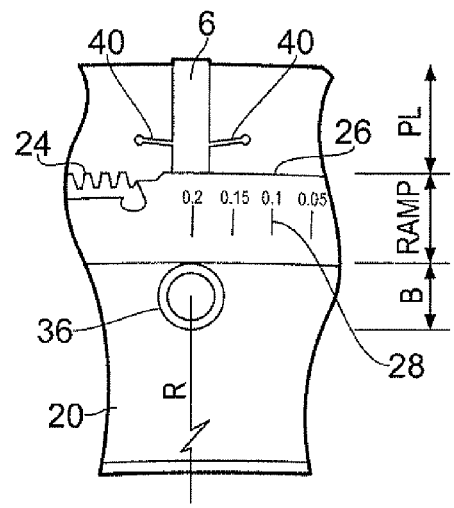
FIG. 5 is an enlarged view of part of the tool as shown in FIG. 4.

In the position shown in FIG. 4, the adjustment ring 8 is positioned so that the left-hand end of the rack 24 engages the pinion 38. Similarly, each adjuster element 6 is situated at the left-hand end of the respective ramp surface 26. This is the lower end of the ramp surface 26, and so each adjuster element 6 is fully retracted in the radial inwards direction under the action of resilient limbs 40 (FIG. 5). Rotation by a suitable tool of any one of the pinions 38 in the clockwise direction will cause counter clockwise rotation of the adjustment ring 8, so displacing the ramp surfaces 26 to the left (as seen in FIG. 4), so causing the adjuster elements 6 to be displaced radially outwardly. The extent to which the adjuster elements 6 are displaced can be read from the scales 28 as visible through the windows 30.

It will be appreciated that the rollers 36 are at the same angular positions as the adjuster elements 6 around the adjustment ring 8. Consequently, forces applied to the adjuster elements 6 by the component to be corrected are transmitted through the segments 20 directly to the rollers 36, so causing no bending moment to be applied to the segments 20.

The adjusting tool may be supported within the component to be corrected by any suitable means. By way of example, a pivotable clip 42 is shown in FIG. 2, which can be swung into engagement with a flange at one end of the component in order to retain the tool in position.

It will be appreciated that, for operation, the tool is supported within the hollow component to be corrected or adjusted, for example by means of the clips 42, so that the tool sits perpendicular to the axis of the hollow component. The pinion 38 is then turned so as to displace the adjustment ring 8 to extend the adjuster elements 6 radially outwardly of the base structure 2. The ramp surfaces 26 are identical to each other, and consequently the adjuster elements 6 move in unison such that their radially outer tips always lie on a common radius from the central axis of the tool, as indicated at X in FIG. 1. The tips of the adjuster elements 6 are profiled to contact the inside surface of the component to be adjusted. After contact with the component by at least some of the adjuster elements 6, the application of torque to the respective pinion 38 generates sufficient force at the tips of the adjuster elements 6 to deform the component to the desired shape, which would be circular in the embodiment described with reference to the drawings. The tool can thus be used to hold the component in the desired shape while further machining or other processing takes place on the component.

The slope of each ramp 26, defined as radial displacement of the surface with respect to angular rotation of the adjustment ring 8, may be linear so that the scale 28 can represent the resulting displacement of the adjuster elements 6 from a nominal position in regular increments.

Because two rollers 36 support each segment 20 and because the segments can pivot relatively to one another by way of the rigid links 32 and the resilient link 34, it is possible to ensure that the individual segments 20 remain in contact with both of the respective rollers 36 at all times. Each segment 20 can thus move over its rollers 36 in a stable manner to ensure that radial displacement of the adjuster elements 6 is consistent and is replicated equally for all of the adjuster elements 6 of the tool.

The sheet metal components of the tool can be formed very accurately, for example by laser cutting, from sheets of an appropriate material, for example steel. it is consequently possible to manufacture the tool with very close tolerances so that accurate shape adjustment of hollow components can be achieved.

Thus, with reference to FIG. 5, the overall diameter of the tool, i.e. diametrically from tip to tip of opposite elements 6 is:

$$\text{Overall diameter}=2\times R+B+2\times RAMP+2\times PL, \text{ where}$$

R=Radius to the centre of the rollers 36
B=Diameter of rollers 36
RAMP=Radial width of the segment 20 at the ramp surface 26
PL=The length of the adjuster element 6

As the tolerance achievable on the roller diameter B is very high this can be ignored. Therefore the overall tolerance is dependent upon 2×(R+RAMP+PL). The tolerance on the RAMP and PL is purely dependent upon the repeatability of the laser used to cut the parts and is therefore less than 10 μm for each part.

The radius R from the axis X to the centre of the mounting hole for the roller 36, is therefore critical and requires that the laser cut position of the hole is controlled as tightly as possible. The resulting roundness tolerance for the plungers has been measured and seen to be consistently better than 0.1 mm.

By way of specific example, the ramp surface 26 may have a radial difference between its ends of 0.6 mm over 110 mm giving a ramp of approximately 5 μm/mm of circumferential displacement. As a result, any small amount of error in the circumferential positioning between the circular strips results in only a very small change in the diameter and is therefore virtually eliminated.

Because only a single resilient link 34 is provided, the segments 20 move as one once installed over the rollers 36. Consequently, errors in displacement between the adjuster elements 6 are eliminated.

For hollow components having a relatively large axial length, it is possible to employ two or more stacked tools along the length of the component in order to ensure the required circularity of the component along its length.

Although the embodiment described above comprises six segments 20, each having two adjuster elements 6, it will be appreciated that other numbers of segments 20 and adjuster elements 6 are possible. Also, it is possible for the tool to be modified to cause the adjuster elements 6 to engage the outer surface of the component to be adjusted.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A shape adjusting tool for adjusting the shape of a hollow component, the tool comprising:
   a base structure carrying a plurality of adjuster elements which are distributed circumferentially about an axis of the tool; and
   an adjustment ring which is mounted on the base structure for rotation about the axis, the adjustment ring being resilient in the circumferential direction,
   wherein a respective ramp arrangement is provided on the adjustment ring corresponding to each adjuster element whereby rotation of the adjustment ring about the axis causes radial displacement of each adjuster element.

2. A shape adjusting tool as claimed in claim 1, wherein the adjustment ring includes a resilient element which is resilient in the circumferential direction of the adjustment ring.

3. A shape adjusting tool as claimed in claim 2, wherein the adjustment ring comprises a plurality of segments, the resilient element being disposed at one of junctions between adjacent segments.

4. A shape adjusting tool as claimed in claim 3, wherein the other junctions between adjacent segments are rigid in the circumferential direction.

5. A shape adjusting tool as claimed in claim 3, wherein each segment engages two of the adjuster elements through respective ramp arrangements.

6. A shape adjusting tool as claimed in claim 3, wherein there are six of the segments.

7. A shape adjusting tool as claimed claim 5, wherein each ramp arrangement comprises a ramp surface on the adjustment ring which directly engages a respective one of the adjuster elements.

8. A shape adjusting tool as claimed in claim 7, wherein there is a linear relationship between the angular position of the adjustment ring and the radial position of each adjuster element.

9. A shape adjusting tool as claimed in claim 8, wherein the linear relationship is the same for all of the adjuster elements, whereby the adjuster elements move in unison upon rotation of the adjustment ring.

10. A shape adjusting tool as claimed in claim 1, wherein the adjustment ring is supported on the base structure by circumferentially distributed bearing rollers.

11. A shape adjusting tool as claimed in claim 10, wherein the bearing rollers are disposed respectively at the same angular positions as the adjuster elements.

12. A shape adjusting tool as claimed in claim 10, wherein the adjustment ring comprises a plurality of segments, a resilient element being disposed at one of junctions between adjacent segments and each segment being supported by two bearing rollers.

13. A shape adjusting tool as claimed in claim 1, wherein the adjustment ring comprising a circumferentially extending toothed rack and the base structure comprises a pinion, whereby rotation of the pinion causes rotation of the adjustment ring.

14. A shape adjusting tool as claimed in claim 5, wherein the ramp arrangement is disposed so as to drive the adjuster elements radially outwardly on rotation of the adjustment ring.

* * * * *